(12) United States Patent
Bausola et al.

(10) Patent No.: US 7,291,081 B2
(45) Date of Patent: Nov. 6, 2007

(54) VARIABLE-RATIO TRANSMISSION DEVICE

(75) Inventors: Giuseppe Bausola, Turin (IT); Giovanni Contardo, Salbertrand (IT)

(73) Assignee: Orbitech Engineering S.r.l., Turin (IT)

( * ) Notice: Subject to any disclaimer, the term of this patent is extended or adjusted under 35 U.S.C. 154(b) by 219 days.

(21) Appl. No.: 10/538,983

(22) PCT Filed: Dec. 5, 2003

(86) PCT No.: PCT/IT03/00802

§ 371 (c)(1),
(2), (4) Date: Jun. 14, 2005

(87) PCT Pub. No.: WO2004/055411

PCT Pub. Date: Jul. 1, 2004

(65) Prior Publication Data

US 2006/0052205 A1    Mar. 9, 2006

(30) Foreign Application Priority Data

Dec. 16, 2002   (IT)   .......................... PC2002A0038

(51) Int. Cl.
*F16H 3/70* (2006.01)
*F16H 23/00* (2006.01)

(52) U.S. Cl. ...................................... 475/169; 475/163

(58) Field of Classification Search ................ 475/163, 475/164, 169, 170, 168
See application file for complete search history.

(56) References Cited

U.S. PATENT DOCUMENTS

| 1,771,807 | A |   | 7/1930 | Mitchell |
| 1,798,269 | A |   | 3/1931 | Nietsche |
| 1,896,462 | A |   | 2/1933 | Nietsche |
| 3,590,659 | A | * | 7/1971 | Maroth ...................... 475/164 |
| 3,895,540 | A |   | 7/1975 | Davidson |
| 4,266,446 | A |   | 5/1981 | Fritsch |
| 4,296,647 | A | * | 10/1981 | Kemper ....................... 475/26 |
| 5,718,652 | A | * | 2/1998 | Coronel ...................... 475/169 |
| 6,348,021 | B1 | * | 2/2002 | Lemanski ................... 475/164 |
| 6,648,786 | B1 | * | 11/2003 | Poehlau ...................... 475/163 |

FOREIGN PATENT DOCUMENTS

| DE | 25 16 474 A | 9/1976 |
| DE | 42 12 613 A1 | 10/1993 |
| GB | 1069814 A | 5/1967 |

* cited by examiner

*Primary Examiner*—Roger Pang
(74) *Attorney, Agent, or Firm*—David A. Farah; Sheldon Mak Rose & Anderson

(57) ABSTRACT

A variable-ratio transmission device for use in connection with a machine, such as a vehicle, comprising a stepless speed change gear with a continuously variable-ratio over an extremely wide range of speeds.

10 Claims, 2 Drawing Sheets

VARIABLE-RATIO TRANSMISSION DEVICE

CROSS-REFERENCE TO RELATED APPLICATIONS

This application is a national phase filing of International Patent Application No. PCT/IT2003/000802 entitled "Variable-Ratio Transmission Device," filed Dec. 5, 2003, which claims priority from Italian Patent Application No. PC2002A000038 filed Dec. 16, 2002, the contents of which are incorporated by reference herein in their entirety.

FIELD

The present invention is related to the field of motion transmission kinematisms, particularly for vehicles.

BACKGROUND

Transmission devices for motor vehicles that have a continuously changing ratio are highly useful, both to provide a more comfortable ride, and to optimize engine efficiency for a given rotation speed. Several different types of transmission devices are known that comprise stepless speed change gears, but these transmission devices are cumbersome and cannot be incorporated into certain types of vehicles, such as for example, bicycles, motorcycles or other two-wheeled vehicles.

Therefore, there is a need for a new transmission device that has a continuously changing ratio, and that can be incorporated into smaller vehicles, such as motorcycles and bicycles.

SUMMARY

The present invention is a variable-ratio transmission device that operates continuously. The transmission device comprises a first support with a slanted axis. The first support comprises a first circular series of teeth or rollers that rotates orbitally around the slanted axis of the first support, and that meshes with a crown with teeth that are parallel to the slanted axis. The crown can directly actuate a device, such as for example, the hub of a two-wheeled vehicle. According to a preferred embodiment of the invention, from its opposite part, the crown has a second series of teeth that mesh with a circular series of rollers assembled on a second support with a slanted axis. The second circular series of rollers rotate orbitally around the slanted axis of the second support. The second support is connected to a device.

The transmission device of the present invention comprises means for sliding the first support and the second support axially, in order to continuously change the reduction ratio. Therefore, a transmission device according to the present invention comprises a stepless speed change gear with a continuously variable-ratio over an extremely wide range of speeds.

FIGURES

Figure 1:
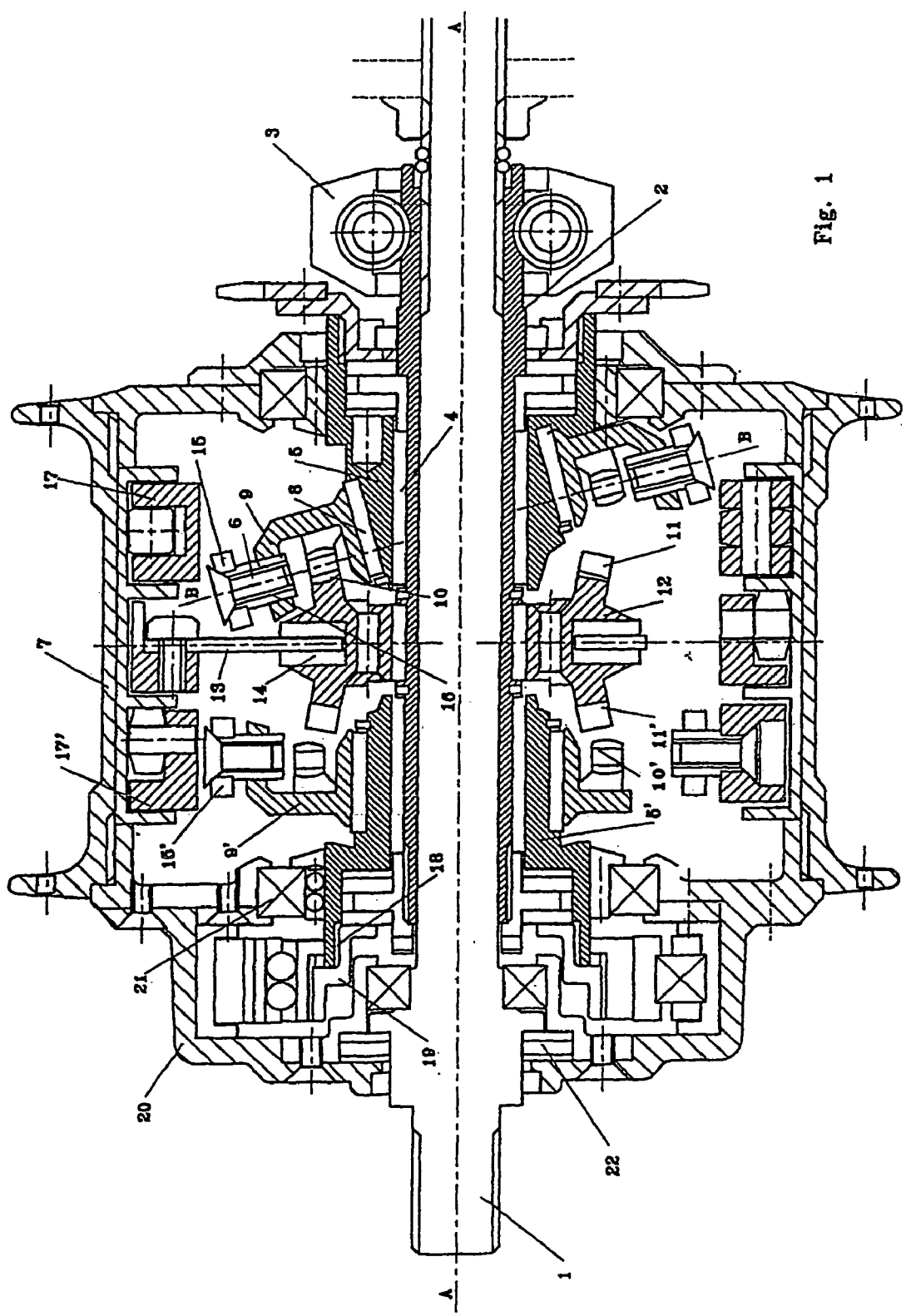
Figure 2:
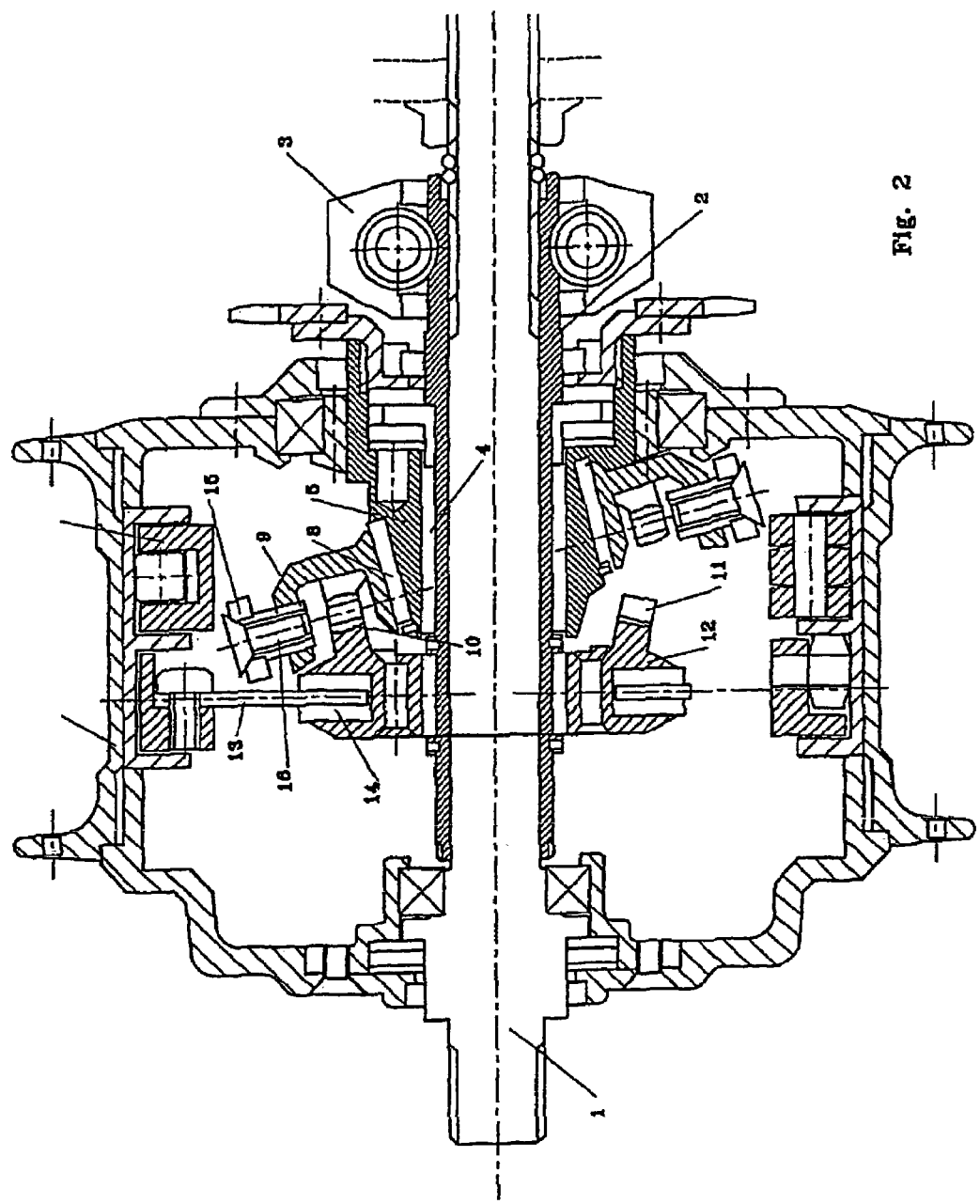

These and other features, aspects and advantages of the present invention will become better understood with regard to the following disclosure, appended claims, and accompanying figures where:

FIG. 1 is a cross-sectional view of one embodiment of a transmission device according to the invention; and FIG. 2 is a cross-sectional view of another embodiment of a transmission device according to the invention.

DESCRIPTION

According to one embodiment of the present invention, there is provided a continuously variable-ratio transmission device useful for a wide range of applications. Because the speed of the transmission device can be changed over an extremely wide range, and the compact configuration of the transmission device as disclosed in this disclosure, the transmission device of the present invention is particularly useful in small vehicles such as motorcycles and bicycles. Further, the transmission device of the present invention, when made of plastics or other strong, lightweight material, can be used in major household appliances and in cutting machines, or similar machines. The compact configuration of the transmission device according to the invention allows it to be easily inserted into the hub of a motorcycle wheel. According to another embodiment of the present invention, there is provided a motor vehicle or a self-propelled vehicle comprising a transmission device according to the present invention. According to another embodiment of the present invention, there is provided a machine comprising a transmission device according to the present invention. In one embodiment, the machine is a vehicle. In a preferred embodiment, the vehicle is a two-wheeled vehicle. In another preferred embodiment, the vehicle is selected from the group consisting of a bicycle and a motorcycle. The transmission device of the present invention will now be disclosed in greater detail.

Though the following disclosure refers, by way of example, to using the transmission device according to the present invention for two-wheeled vehicles such as motorcycles and bicycles, the present device can also be used for other applications. Therefore, the scope of use of the present transmission device should not be construed to be limited by the examples, but the transmission device is suitable for use on a wide range of machines, as will be understood by those with skill in the art with reference to this disclosure.

Referring now to FIG. 1, there is shown a cross-sectional view of one embodiment of a transmission device according to the invention. As can be seen, the transmission device is assembled around a support shaft 1 having an axis A-A, for example, the shaft of the driving wheel of a two-wheeled vehicle. The support shaft 1 is grooved and a first hollow shaft 2 is assembled on the support shaft 1. The first hollow shaft 2 can slide axially with respect to the support shaft 1. The position of the first hollow shaft 2 can be changed, for example, by means of a ring nut 3 or by another means, such as for example, by means of mechanisms comprising worm screws, or by an electronic circuit control.

A second hollow shaft 5 and a third hollow shaft 5' are assembled onto the first hollow shaft 2 by bearings, bushings 4 or the like, between the first hollow shaft 2, and the second hollow shaft 5 and the third hollow shaft 5'. The second hollow shaft 5 is the motion inlet shaft and, when the transmission is used for two-wheeled vehicles, is rigidly connected to motor means, such as a pinion or a toothed crown 6, that is moved by a chain (not shown) of a vehicle. The third hollow shaft 5' is connected to the wheel hub 7.

As can be further seen in FIG. 1 and FIG. 2, the external surface of the second hollow shaft 5 comprises, over at least a portion of its length, a cylindrical surface with an axis B-B that is inclined with respect to the axis A-A of the support shaft 1. In use, following the rotation of the second hollow shaft 5 around axis A-A, the axis B-B of the inclined portion describes a tapered surface with its vertex on axis A-A.

A first support 9 is connected to the second hollow shaft 5 next to the portion with inclined axis by bearings or bushings 8. The first support 9 comprises a disk or a wheel that has, circumferentially, a plurality of teeth or rollers 10 whose axis rests on a plane that is parallel with the plane of the first support 9. The teeth or rollers 10 are configured to engage a first series of teeth or rollers 11 of a wheel 12 assembled in an idle way on a second support 13 that is integral with the wheel hub 7. Bearings or bushings 14 allow the wheel 12 to rotate freely with respect to the second support 13.

A first ring 15 is hinged to the first support 9 of the rollers 10 through a first pair of opposing pins 16, allowing the ring 15 to rotate relative to the first support 9, around a first axis that is substantially parallel to the plane of the first support 9. The ring 15 is also hinged to an external second ring 17 that is part of a free-wheeled device that is integral with the internal surface of the hub 7, through a second pair of opposing pins (not shown) that are offset by about 90° with respect to first pair of opposing pins 16. Therefore, the first ring 15 and the second ring 17 form a universal joint that allows the first support 9 of the rollers 10 to rotate with respect to the ring 15 around a first axis, and with respect to the second ring 17 around a second axis that is perpendicular to the first axis. In use, due to ability to move around two perpendicular axes, the first support 9 can perform an orbital movement, allowing the rollers 10 to engage the teeth 11 of the wheel 12.

The number of rollers 10 on the first support 9 is different from the number of teeth 11 of the wheel 12 that are engaged by the rollers 10.

According to a one embodiment of the present invention, as shown in FIG. 1, the wheel 12 has teeth 11' opposite to the teeth 11. The teeth 11' engage a series of rollers assembled on a second (disk) support 9' corresponding to the first support 9 and assembled on a portion of the third hollow shaft 5' that has a slanted axis, by bearings between the second support 9' and the third hollow shaft 5'. The third hollow shaft 5' engages a free wheel 19, through teeth 18. The free wheel 19 is assembled on a box 20 secured to the wheel hub 7. The wheel hub 7 is assembled on the second hollow shaft 5 and the third hollow shaft 5' by interposing bearings 21 that allow the wheel hub 7 to rotate freely with respect to the second hollow shaft 5 and the third hollow shaft 5'.

Like the first support 9, the second support 9' is hinged to a second ring 15' in turn hinged, according to an axis that is perpendicular to the previous one, to a free-wheel device 17', on the internal surface of the hub 7. When the present transmission device is used on motor vehicles, one of more than one clutch disk 22 connects the free wheel 19 and the box 20.

The transmission device of the present invention is used as follows. Motion from the chain of the machine (not shown) is transmitted to the pinion 6, that in turn rotates the second hollow shaft 5. Rotation of the inclined portion of the second hollow shaft 5 causes the first support 9 to make an orbital movement that engages the rollers 10, causing the rollers 10 to engage the teeth 11 of the wheel 12. The first support 9 can also rotate angularly around axis A-A together with the first hollow shaft 5. These orbital and angular movements are independent and, and the total movement can be algebraically summed from these individual movements.

In use, the first support 9 can rotate angularly around the axis A-A, always engaging with the same roller the toothed wheel 12 that is thereby dragged rotating at the same speed of the shaft 5.

The second movement is the orbital one, so that the first support 9 assumes a different rotation speed with respect to the eccentric of the second hollow shaft 5 and therefore starts "orbiting" by sequentially meshing with the wheel 12, namely with one tooth after the other, like a traditional gear.

In this case, with an orbital movement of the first support 9, the wheel 12 is rotated with a reduced angular speed with respect to the angular speed of the second hollow shaft 5, with a reduction ratio that changes depending on the ratio between number of support rollers and number of teeth 11, in addition to the axial position of the first support 9, by changing which it is possible to change the lever arm length with which the rollers 10 go and mesh the rollers 10 of the toothed wheel 12, thereby changing the reduction ratio.

At the beginning of operation, the hub 7 is motionless and prevents the first ring 15 and the second ring 17 from rotating, so that the first support 9 can only perform an orbital movement, rotating the wheel 12 with a certain reduction ratio. On the opposite side, the teeth 11' mesh with the rollers 10' of the second support 9'. The free wheel 17' prevents the assembly from rotating backwards, so that the second support 9' is forced to perform an orbital movement that moves it forward. This movement is transformed into a rotation of the eccentric of the third hollow shaft 5' that can be used to rotate, through the free wheel 19, the box 20 with its integral hub 7. As soon as the hub starts rotating through the free wheel 19, it transmits' the angular motion to the ring 15 and thereby, to the first support 9 of the rollers 10, which starts rotating around axis A-A with a rotation motion that is summed to the orbital motion and that is transmitted to the wheel 12. At this point, the central wheel 12, with the teeth 11 and the teeth 11', is rotated with two types of meshing, orbital and angular ones, as well as the second support 9'. The angular movement is automatically limited by the number of revolutions of the hub 7.

In one embodiment, such as for example when the transmission device of the present invention is used in a motor vehicle, the one or more than one clutch disk 22 can be used to disengage the transmission device when the vehicle is not moving. Therefore, the transmission device of the present invention has a ratio that changes continuously and over a very wide range, is a compact size, and can be used for numerous applications, including in two-wheeled vehicles, such as motorcycles and bicycles.

Referring now to FIG. 2, there is shown is a cross-sectional view of another embodiment of a transmission device according to the invention. As can be seen, in this embodiment, the transmission device has a simplified configuration, in that it does not have the second teeth 11', the second support 9' and the structures connected downstream of the second teeth 11', the second support 9'. Further, in this embodiment, the central wheel 12 is directly connected to the hub 7. The hub 7 is dragged and initially moves only due to the orbital motion of the first support 9. Then, the hub 7, little by little, replaces the orbital motion of the support 9 by overlapping it and, finally, an angular motion is obtained. This embodiment is particularly suitable for bicycles and related vehicles.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference to their entirety.

What is claimed is:

1. A variable-ratio transmission device for use in connection with a machine, the transmission device having a reduction ratio and comprising:
   a first support assembled idle on a second hollow shaft with a slanted axis connected to a motor means;
   a plurality of teeth or rollers on the first support;
   a wheel with a first series of teeth or rollers configured to connect to the machine; and
   means for axially sliding the first support, in order to change the reduction ratio of the transmission device;
   where rotation of the second hollow shaft causes the first support to perform an orbital movement, thereby causing the teeth or rollers on the first support to engage the teeth on the wheel.

2. The variable-ratio transmission device according to claim 1, further comprising a second series of teeth or rollers on the wheel that engage the plurality of teeth or rollers on a second support configured to connect to the machine.

3. The variable-ratio transmission device according to claim 1, further comprising means for axially sliding the second support to change the reduction ratio of transmission device.

4. The variable-ratio transmission device according to claim 1, where the wheel further comprises a second series of teeth or rollers that engages the plurality of teeth or rollers on a second support.

5. A variable-ratio transmission device for use in connection with a machine, the transmission device comprising:
   a support shaft having an axis;
   a second hollow shaft rotatingly assembled on the support shaft;
   a first support assembled on the second hollow shaft, and configured to rotate around a slanted axis with respect to the axis of the support shaft;
   a plurality of teeth or rollers arranged in a circular series on the first support;
   a wheel assembled idle on the support shaft;
   a first series of teeth or rollers on the wheel adapted to be engaged by the plurality of teeth or rollers on the first support;
   means to connect the wheel to the machine to which motion is transmitted; and
   means for axially sliding the first support or the wheel with respect to the support shaft;
   where rotation of the second hollow shaft causes the first support to perform an orbital movement, thereby causing the teeth or rollers on the first support to engage the teeth on the wheel.

6. The variable-ratio transmission device according to claim 5, where the wheel further comprises a second series of teeth or rollers that engages the plurality of teeth or rollers on a second support.

7. The variable-ratio transmission device according to claim 6, where the second support is assembled with its axis slanted on a third hollow shaft that is also assembled on the support shaft; and
   where the third hollow shaft is configured to connect to the machine.

8. The variable-ratio transmission device according to claim 7, where the third hollow shaft is connected through a free wheel assembled on a box that is configured to connect to a wheel hub of the machine.

9. The variable-ratio transmission device according to claim 8, further comprising a first ring hinged to the first support, and a second ring hinged to the second support;
   where the first ring and the second ring can rotate around a first axis with respect to the first support and the second support; and
   where the first ring and the second ring can rotate around a second axis that is perpendicular with the first axis with respect to the first support and the second support.

10. The variable-ratio transmission device according to claim 9, where the second hollow shaft and the third hollow shaft are rotatingly assembled on a grooved first hollow shaft; and
    wherein the first hollow shaft is slidingly assembled on the support shaft.

* * * * *